United States Patent
Zhang et al.

(10) Patent No.: US 12,535,822 B2
(45) Date of Patent: Jan. 27, 2026

(54) MAPPING METHOD, COMPUTER-READABLE STORAGE MEDIUM, AND ROBOT

(71) Applicant: UBTECH ROBOTICS CORP LTD, Shenzhen (CN)

(72) Inventors: Simin Zhang, Shenzhen (CN); Zhichao Liu, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 317 days.

(21) Appl. No.: 18/143,596

(22) Filed: May 4, 2023

(65) Prior Publication Data
US 2023/0273620 A1 Aug. 31, 2023

Related U.S. Application Data

(63) Continuation of application No. PCT/CN2020/139872, filed on Dec. 28, 2020.

(30) Foreign Application Priority Data

Nov. 6, 2020 (CN) .......................... 202011232065.0

(51) Int. Cl.
G05D 1/00 (2024.01)
(52) U.S. Cl.
CPC ......... *G05D 1/0274* (2013.01); *G05D 1/0214* (2013.01); *G05D 1/024* (2013.01)
(58) Field of Classification Search
CPC .... G05D 1/0274; G05D 1/0214; G05D 1/024; G05D 1/0236; G05D 1/0221;
(Continued)

(56) References Cited

U.S. PATENT DOCUMENTS 8,209,143 B1 * 6/2012 Anguelov .............. G01C 15/00
702/95
11,555,927 B2 * 1/2023 Huang .................... G01S 17/89
(Continued)

FOREIGN PATENT DOCUMENTS

CN 207965645 U 10/2018
CN 110174894 A 8/2019
(Continued)

OTHER PUBLICATIONS

ISR for PCT/CN2020/139872.
Written opinions of ISA for PCT/CN2020/139872.

*Primary Examiner* — Anne Marie Antonucci
*Assistant Examiner* — Esam Nmn Almadhrhi

(57) ABSTRACT

A mapping method, a computer-readable storage medium, and a robot are provided. The method is applied to a robot including a first lidar and a second lidar, where the first lidar is installed at a position higher than that of the second lidar. The method includes: obtaining a first laser key frame; calculating a current pose of a robot based on the first laser key frame; updating a first probability map based on the current pose and the first laser key frame; obtaining a second laser key frame; updating a second probability map based on the current pose and the second laser key frame; and generating a fused grid map for navigating the robot based on the updated first probability map and the updated second probability map, thereby greatly improving the stability of positioning and navigation.

20 Claims, 5 Drawing Sheets

(58) Field of Classification Search
CPC .. G05D 1/0257; G05D 1/0276; G01C 21/206; G01C 21/383; G01C 21/3837; G01S 17/89; G01S 17/931
See application file for complete search history.

(56) References Cited

U.S. PATENT DOCUMENTS

| | | | |
|---|---|---|---|
| 2011/0082585 A1* | 4/2011 | Sofman | G05D 1/0274 700/258 |
| 2015/0168954 A1* | 6/2015 | Hickerson | G01S 17/04 901/1 |

FOREIGN PATENT DOCUMENTS

| | | |
|---|---|---|
| CN | 110726409 A | 1/2020 |
| CN | 111257909 A | 6/2020 |

\* cited by examiner

MAPPING METHOD, COMPUTER-READABLE STORAGE MEDIUM, AND ROBOT

CROSS REFERENCE TO RELATED APPLICATIONS

The present disclosure is a continuation-application of International Application PCT/CN2020/139872, with an international filing date of Dec. 28, 2020, which claims foreign priority of Chinese Patent Application No. 202011232065.0, filed on Nov. 6, 2020 in the State Intellectual Property Office of China, the contents of all of which are hereby incorporated by reference.

BACKGROUND

1. Technical Field

The present disclosure relates to robot technology, and particularly to a mapping method, a computer-readable storage medium, and a robot.

2. Description of Related Art

Simultaneous localization and mapping (SLAM) for robots is an important method for robots to create laser navigation maps based on lidar data, which plays an important role in the real-time positioning and navigation planning of the subsequent laser navigation. However, in some places such as offices, libraries, nursing homes, and wards, there are many movable objects such as tables, chairs, and hospital beds that are relatively short and generally no more than 1.5 meters in height. These movable objects make the environment of positioning and navigation easy to change, which may lead to poor stability of the positioning and navigation results of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
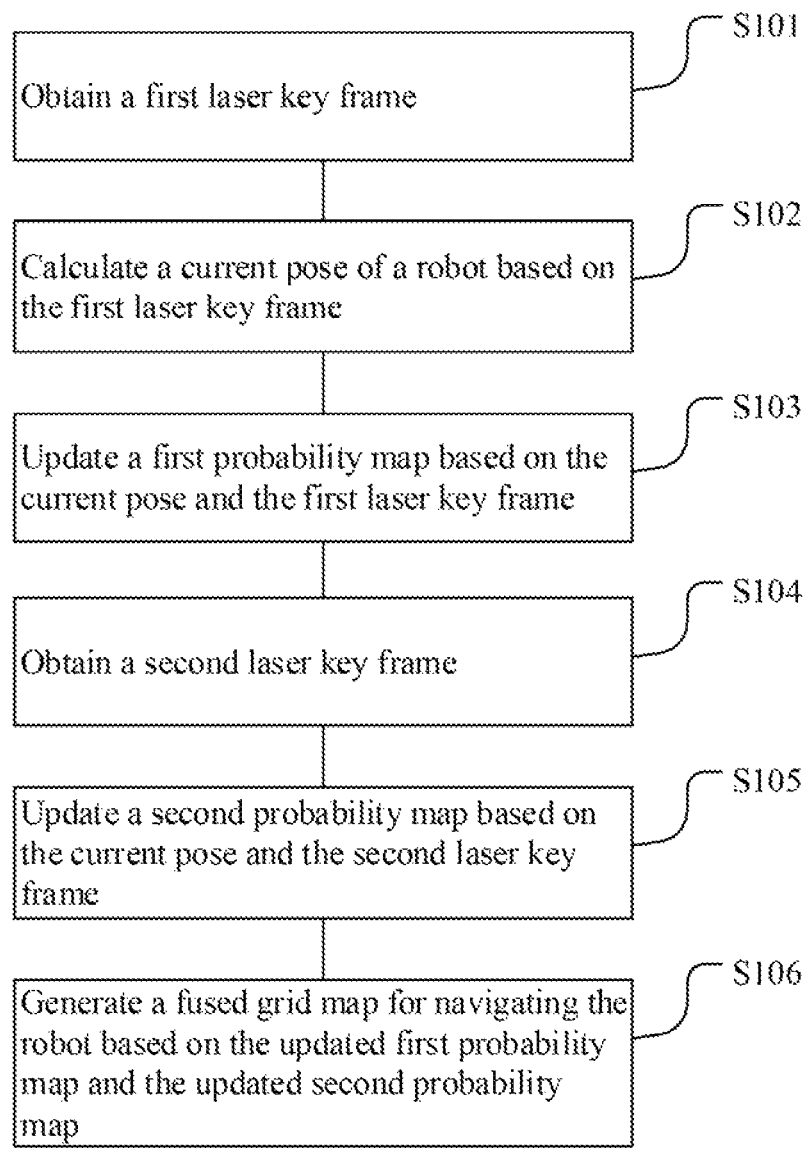
FIG. 1 is a flow chart of a mapping method according to an embodiment of the present disclosure.

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise. It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Generally, there are several methods may be used in laser mapping. One method is particle filter-based laser mapping that uses a particle filter method such as RBPF (Rao-Blackwellized particle filters) to estimate poses, which has small calculation amount and high accuracy when creating small scene maps. Because the particle filter-based method will dramatically increase the required processing resources when the area is large and dual radars are used, while each particle carries a map, the amount of required memory and computation will increase dramatically when creating larger maps and inputting more radar data. Therefore, the particle filter-based method is not suitable for extending to create larger maps and dual-radar mapping.

The other method is key frame matching-based that can perform Joop closure detection and optimization well by establishing constraints between key frames, which also has a structure very suitable for mapping large-area scenes and multi-radar mapping. With the help of its key frame and constraint ideas, enough constraint relationships can be established when using the data of two radar for positioning, so that the created map can be more accurate and clear without ghosting.

However, the existing key frame method only uses the key frames of a single radar in the calculation. If the data of multiple radars are directly input at the same time, the created map is not processed by layered distinction, which will cause the data of the two radars to be mixed. Furthermore, when the data of the two radars are used as one input for positioning, two positions will be generated, which will cause the jittering problem of positioning.

FIG. 1 is a flow chart of a mapping method according to an embodiment of the present disclosure. In this embodiment, a mapping method that can stably and flexibly process the data of dual radars is provided, which may be applied to a robot installed with two lidars, namely a first lidar and a second lidar. In which, the first lidar is installed at a position on the robot which is higher than that of the second lidar. For example, the first lidar may be installed at a higher position on the robot where it cannot detect movable objects such as persons or furniture like tables and chairs. The second lidar may be installed at a lower position on the robot where it can detect the movable objects. The mapping method is a computer-implemented method executable for a processor of the robot. In other embodiments, the method may be implemented through a mapping apparatus shown in FIG. 4 or a robot shown in FIG. 5. As shown in FIG. 1, the mapping method may include the following steps.

S101: obtaining a first laser key frame.

The first laser key frame is the current laser key frame collected by the first lidar.

The robot may detect its surrounding environment through lidar. It works by emitting a detection signal (i.e., laser) to an objective, and then comparing the received signal reflected from the objective with the detection signal. After proper processing, the relevant information of the objective can be obtained, thereby detecting, tracking and identifying the objective. Generally, the robot may collect laser data according to a preset data collection frequency, so as to collect a frame of laser data at a certain time interval. The specific frequency of data collection nay be set according to the actual needs, which will not be limited herein.

After the robot starts to create a map, the first laser data frame may be used as a laser key frame. Then, when obtaining a new laser data frame, the new laser data frame may be compared with the current laser key frame. As an example, if a positional difference between the two frames is larger than a preset positional difference threshold or an angular difference between the two frames is larger than a preset angular difference threshold, the new laser data frame may be determined as a new laser key frame; otherwise, if the positional difference between the two frames is less than or equal to the positional difference threshold while the angular difference between the two frames is less than or equal to the angular difference threshold, it may determine that the new laser data frame is not a new laser key frame. The specific values of the positional difference threshold and the angular difference threshold may be set according to actual needs, which will not be limited herein. As another example, if a time difference between the moment of obtaining the new laser data frame and that of the current laser key frame is larger than a preset time threshold, it may also determine the new laser data frame as a new laser key frame. The specific value of the time threshold may be set according to actual needs, which will not be limited herein. By repeating the forgoing process continuously, each laser key frame in the process of mapping can be obtained sequentially.

It should be noted that the "current laser key frame" mentioned in present disclosure refers to the laser key frame currently being processed by the robot, which refers to a dynamic objective rather than a specific laser key frame. For example, the robot first processes the laser key frame collected for the first time to denote as laser key frame 1; then the current laser key frame is laser key frame 1; after the robot finishes processing laser key frame 1, it continues to process the laser key frame collected for the second time to denote as laser key frame 2, then the current laser key frame is laser key frame 2; after the robot finishes processing laser key frame 2, it continues to process the laser key frame collected for the third time to denote as laser key frame 3, then the current laser key frame is laser key frame 3; . . . ; and so on.

S102: calculating a current pose of the robot based on the first laser key frame.

After the first laser key frame is obtained, iterative optimization may be performed by Gauss-Newton matching method so that laser contour points contained in the first laser key frame are aligned with contour points of a first probability map, and the current pose of the robot may be back-calculated according to the aligned laser contour points.

In which, the first probability map may be a probability map corresponding to the first lidar, that is, the probability map created according to each laser key frame collected by the first lidar. The first probability map may be created initially when the first lidar captures the first laser key frame, then the map may be updated whenever a laser key frame is collected.

S103: updating a first probability map based on the current pose and the first laser key frame.

After the current pose is determined, the data in the first laser key frame may be superimposed on the first probability map according to the current pose, so as to update a first count value and a second count value of each raytrace grid corresponding to the first laser key frame in the first probability map, thereby obtaining the updated first count value and the updated second count value.

Figure 2:
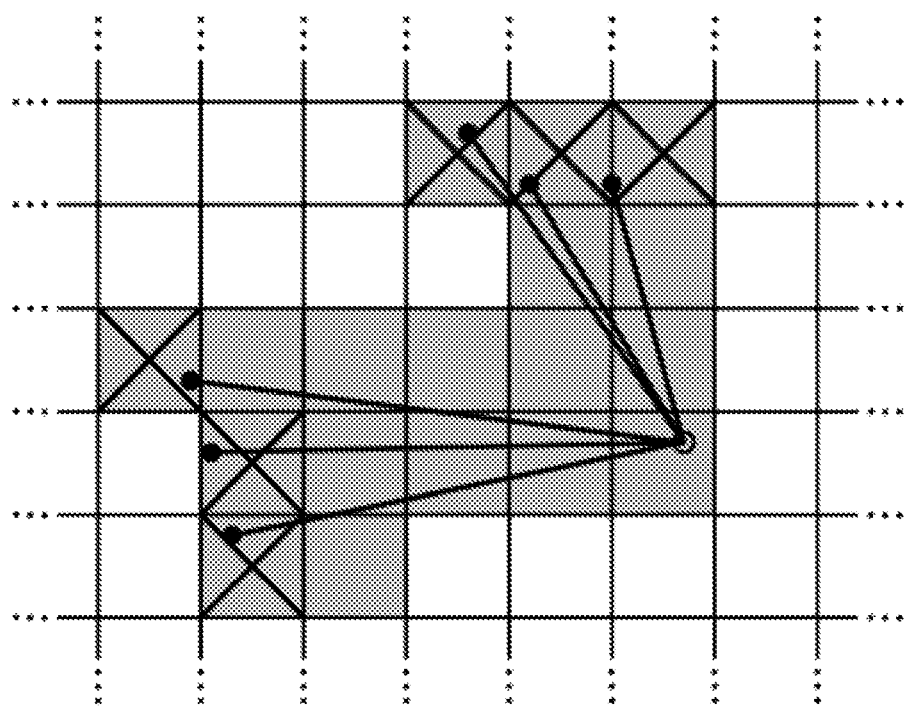
FIG. 2 is a schematic diagram of the process of laser hitting an obstacle point according to an embodiment of the present disclosure.

FIG. 2 is a schematic diagram of the process of laser hitting an obstacle point according to an embodiment of the present disclosure. As shown in FIG. 2, the hollow dot represents the lidar, and the solid dots represent the obstacles. The grid where the obstacle is located is marked by a cross, and is called obstacle grid. The grids which the ray from the lidar to the obstacles pass are marked in grey, and are called raytrace grids. The above-mentioned raytrace grid is a grid of the first probability map where a ray from the first lidar to the obstacle passes. Please note that the raytrace grids include the obstacle grid. The first count value is the amount of times the raytrace grid being hit by the ray emitted from the first lidar. The second count value of the grid is the amount of times that the grid is the raytrace grid.

In which, the first count value is denoted as n1, and the second count value is denoted as visit1. When the ray from the lidar hits one grid, n1 and visit1 of the grid will be added by "1" at the same time, that is, to execute: n1=n1+1, and visit1=visit1+1; when the ray of the lidar does not hit the grid, while the grid is the raytrace grid, n1 remains unchanged, and visit1 is added by "1", that is, only to execute: visit1=visit1+1.

Then, the occupancy probability of each raytrace grid in the first probability map may be updated according to the updated first count value and the updated second count value, respectively.

For example, for each raytrace grid, its occupancy probability in the first probability map may be calculated using an equation of:

$$P(\text{hit1}) = n1/\text{visit1};$$

where, P(hit1) is the occupancy probability of the grid in the first probability map.

On the basis of the original first probability map, the updated first probability map may be obtained by traversing all the link grids to update their occupancy probabilities.

S104: obtaining a second laser key frame.

The second laser key frame is the current laser key frame collected by the second lidar.

S105: updating a second probability map based on the current pose and the second laser key frame.

In which, the second probability map may be a probability map corresponding to the second lidar, that is, the probability map created according to each laser key frame collected by the second lidar. The second probability map may be created initially when the second lidar captures the second laser key frame, then the map may be updated whenever a laser key frame is collected.

After the current pose is determined, the data in the second laser key frame may be superimposed on the second probability map according to the current pose, so as to update a third count value and a fourth count value of each raytrace grid corresponding to the second laser key frame in the second probability map, thereby obtaining the updated third count value and the updated fourth count value.

In which, the above-mentioned raytrace grid is a grid of the second probability map where a ray from the second lidar to the obstacle passes. The third count value is the amount of times the raytrace grid being hit by the ray emitted from the second lidar, and the fourth count value is the amount of times the grid is the raytrace grid.

In which, the third count value is denoted as n2, and the fourth count value is denoted as visit2. It is easy to understand that when the ray hits a certain grid, n2 and visit2 of the grid will be added by "1" at the same time, that is, to execute: n2=n2+1, and visit2=visit2+1; when the ray does not hit the grid, and the grid is on the line between the grid hit by the ray from the second lidar and the second lidar, n2 remains unchanged, and visit2 is added by "1", that is, only to execute: visit2=visit2+1.

Then, the occupancy probability of each link grid in the second probability map may be updated according to the updated third count value and the updated fourth count value, respectively.

For example, for each raytrace grid, its occupancy probability in the second probability map may be calculated using an equation of:

$P(hit2)=n2/visit2;$ where, P(hit2) is the occupancy probability of the grid in the second probability map.

On the basis of the original second probability map, the updated second probability map may be obtained by traversing all the link grids to update their occupancy probabilities.

S106: generating a fused grid map for navigating the robot based on the updated first probability map and the updated second probability map.

First, a first grid map corresponding to the updated first probability map may be generated, and a second grid map corresponding to the updated second probability map may be generated.

Taking any grid in the first grid map (denoted as a target grid) as an example, an occupancy probability of the target grid in the updated first probability map may be determined, and a grid type of the target grid according to the occupancy probability may be determined. For example, the target grid may be determined as a black grid, in response to the occupancy probability being larger than or equal to a preset probability threshold; the target grid may be determined as a white grid, in response to the occupancy probability being smaller than the preset probability threshold; and the target grid may be determined as a gray grid, in response to the occupancy probability being null, that is, visit1=0. In this manner, by traversing all the grids in the first grid map, the grid types of all the grids can be obtained, and the map composed of these black, white and gray grids is the first grid map. The specific value of the probability threshold may be set according to actual needs, which will not be limited herein. The generation process of the second grid map is similar to that of the first grid map, which will not be limited herein.

Then, the fused grid map may be obtained by fusing the first grid map and the second grid map according to a preset relative pose conversion relationship.

The relative pose conversion relationship is a relative pose transformation relationship between the first lidar and the second lidar. In the process of setting the relative pose conversion relationship, a rough relative pose between the two lidars may be determined through the mechanical structure of the robot first, and then an accurate calibration may be performed by detecting the surrounding environment through the two lidars, thereby obtaining the relative pose conversion relationship between the two lidars. In this embodiment, the two lidars may be installed with the scanning plane of each in a horizontal direction, hence the two lidars can detect the same object (denoted as the target object) placed vertically along a plumb line direction which is perpendicular to the horizontal direction, a first ranging result of the first lidar for the target object and a second ranging result of the second lidar for the target object may be obtained, the relative pose conversion relationship may be determined based on the first ranging result and the second ranging result. For example, a difference between the two ranging results may be calculated to obtain a horizontal distance between the two lidars to take as the relative pose conversion relationship.

When performing map fusion, the first grid map and the second grid map may be aligned according to the relative pose conversion relationship first, and then the maps may be fused to obtain the fused grid map.

Figure 3:
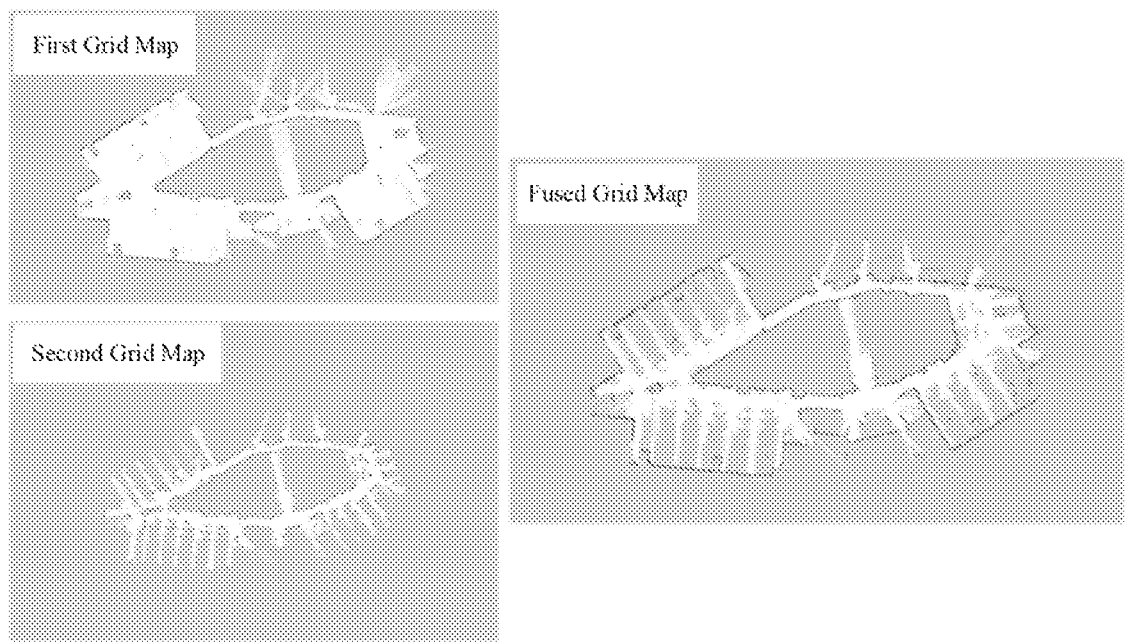
FIG. 3 is a schematic diagram of fusing the first grid map and the second grid map according to an embodiment of the present disclosure.

In this embodiment, for each grid in the fused grid map, the grid is determined as a black grid, in response to the grid meeting a first preset condition that the grid corresponds to a black grid in the first grid map; the grid in the fused grid map is determined as a white grid, in response to the grid meeting a second preset condition that the grid corresponds to a grid that is not a black grid in the first grid map but corresponds to a white grid in the second grid map; and the grid in the fused grid map is determined as a gray grid, in response to the grid neither meeting the first preset condition nor meeting the second preset condition. In which, the first preset condition is that the grid corresponds to a black grid in the first grid map, and the second preset condition is that the grid does not correspond to a black grid in the first grid map and the grid corresponds to a white grid in the second grid map. In this manner, by traversing all the grids in the fused grid map, the grid types of all the grids in the fused grid map can be determined, thereby obtaining the final fused grid map. FIG. 3 is a schematic diagram of fusing the first grid map and the second grid map according to an embodiment of the present disclosure. As shown in FIG. 3, it should be noted that the figure only shows one possible fusion manner, and other fusion manners may also be used according to actual needs, which will not be limited herein.

To sum up, in this embodiment, a SLAM architecture with dual lidars for simultaneous mapping is adopted in the robot, that is, one first lidar at the higher position and one second lidar at the lower position are used for simultaneous mapping. Since the position of the first lidar is relatively high, it will be less disturbed by movable objects, so it can provide a relatively stable positioning result. On this basis, the data of the two lidars are fused for mapping so as to obtain one fused map for navigation, which can bypass the movable objects in the environment where the robot is located in advance, thereby greatly improving the stability of positioning and navigation.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 4:
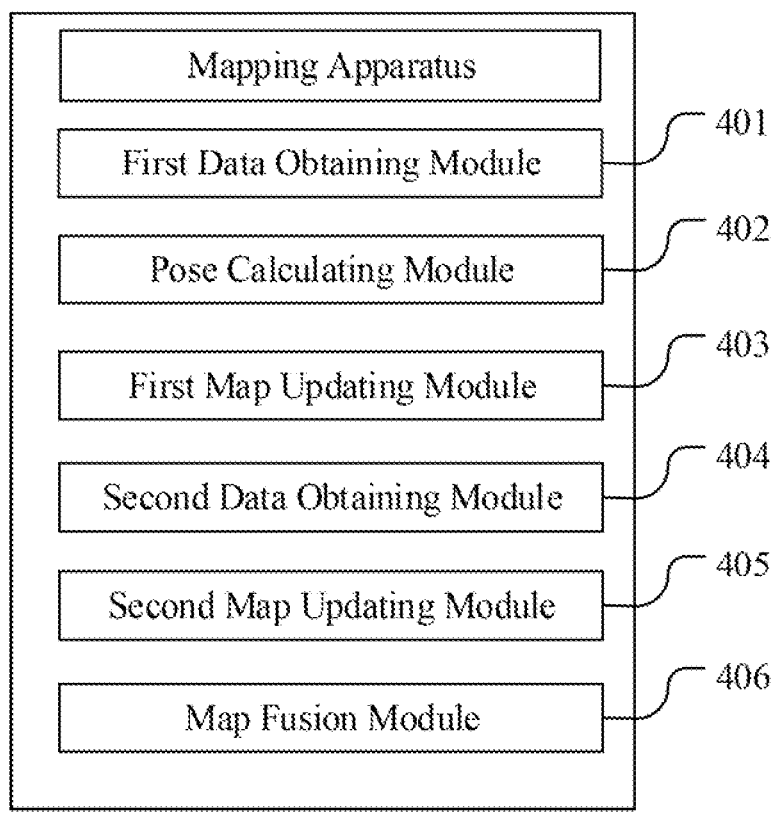
FIG. 4 is a schematic block diagram of a mapping apparatus according to an embodiment of the present disclosure.

FIG. 4 is a schematic block diagram of a mapping apparatus according to an embodiment of the present disclosure. In this embodiment, a mapping apparatus corresponding to the mapping method in the previous embodiment is provided. The mapping apparatus may be applied to the above-mentioned robot such as the robot shown in FIG. 5. The robot may include the first lidar and the second lidar, where the first lidar is installed at a position on the robot which is higher than that of the second lidar. As shown in FIG. 4, the mapping apparatus may include:
- a first data obtaining module 401 configured to collect, by the first lidar, a current laser key frame to take as a first laser key frame;
- a pose calculating module 402 configured to calculate a current pose of the robot based on the first laser key frame;
- a first map updating module 403 configured to update a first probability map based on the current pose and the first laser key frame, where the first probability map is a probability map corresponding to the first lidar;
- a second data obtaining module 404 configured to collect, by the second lidar, a current laser key frame to take as a second laser key frame;
- a second map updating module 405 configured to update a second probability map based on the current pose and the second laser key frame, where the second probability map is a probability map corresponding to the second lidar; and
- a map fusion module 406 configured to generate a fused grid map for navigating the robot based on the updated first probability map and the updated second probability map.

Furthermore, the map fusion module 406 may include:
- a first grid map generating submodule configured to generate a first grid map corresponding to the updated first probability map;
- a second grid map generating submodule configured to generate a second grid map corresponding to the updated second probability map; and
- a map fusion submodule configured to obtain the fused grid map by fusing the first grid map and the second grid map according to a preset relative pose conversion relationship between the first lidar and the second lidar.

Furthermore, the first grid map generating submodule may include:
- an occupancy probability calculating unit configured to determine an occupancy probability of a target grid in the updated first probability map, where the target grid is any grid in the first grid map; and
- a grid type determining unit configured to determine a grid type of the target grid according to the occupancy probability.

Furthermore, the grid type determining unit may be configured to:
- determine the target grid as a black grid, in response to the occupancy probability being larger than or equal to a preset probability threshold;
- determine the target grid as a white grid, in response to the occupancy probability being smaller than the preset probability threshold; and
- determine the target grid as a gray grid, in response to the occupancy probability being null.

Furthermore, the mapping apparatus may further include:
- a ranging module configured to obtain a first ranging result of the first lidar for a target object and a second ranging result of the second lidar for the target object, where the target object is placed vertically; and
- a relative pose determining module configured to determine the relative pose conversion relationship based on the first ranging result and the second ranging result.

Furthermore, the map fusion submodule may include:
- an alignment unit configured to align the first grid map and the second grid map according to the preset relative pose conversion relationship;
- a black grid determining unit configured to determine each grid in the fused grid map as a black grid, in response to the grid meeting a first preset condition that the grid corresponds to a black grid in the first grid map; and
- a white grid determining unit configured to determine the grid in the fused grid map as a white grid, in response to the grid meeting a second preset condition that the grid corresponds to a grid that is not a black grid in the first grid map but corresponds to a white grid in the second grid map; and)
- a gray grid determining unit configured to determine the grid in the fused grid map as a gray grid, in response to the grid neither meeting the first preset condition nor meeting the second preset condition.

Furthermore, the first map updating module 403 may be configured to:
- update a first count value and a second count value of each raytrace grid in the first probability map corresponding to the first laser key frame according to the current pose, where the raytrace grid is a grid of the first probability map where a ray from the first lidar to the obstacle passes, the first count value is an amount of times the raytrace grid being hit by the ray emitted by the first lidar, and the second count value is an amount of times that the raytrace grid is the raytrace grid; and
- obtain the updated first probability map by updating an occupancy probability of each link grid in the first probability map based on the updated first count value and the update second count value.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 5:
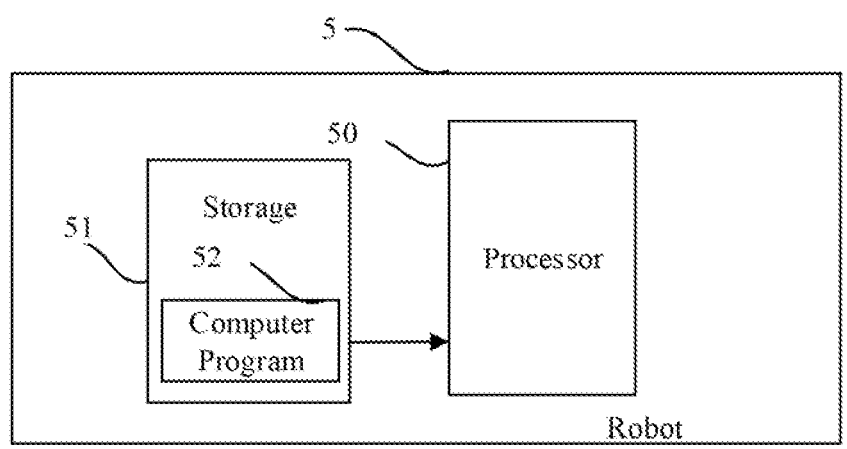
FIG. 5 is a schematic block diagram of a robot according to an embodiment of the present disclosure.

FIG. 5 is a schematic block diagram of a robot according to an embodiment of the present disclosure. For convenience of description, only parts related to this embodiment are shown. As shown in FIG. 5, in this embodiment, the robot 5 includes a processor 50, a storage 51, and a computer program 52 stored in the storage 51 and executable on the processor 50. When executing (instructions in) the computer program 52, the processor 50 implements the steps in the above-mentioned embodiments of the mapping method, for example, steps S101-S106 shown in FIG. 1. Alternatively, when the processor 50 executes the (instructions in) computer program 52, the functions of each module/unit in the above-mentioned device embodiments, for example, the functions of the modules 401-406 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5.

It can be understood by those skilled in the art that FIG. 5 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/ robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented mapping method for a robot having a first lidar and a second lidar, wherein the method comprises:
   providing the robot comprising a processor electrically coupled to the first lidar and the second lidar, wherein the first lidar is installed at a first position on the robot, the second lidar is installed at a second position on the robot, and the first position is higher than the second position, and wherein the first position prevents the first lidar from detecting a movable object in an external environment where the robot is located, and the second position enables the second lidar to detect the movable object;
   collecting, by the first lidar, a current laser key frame to take as a first laser key frame;
   calculating, by the processor, a current pose of the robot based on the first laser key frame;
   updating, by the processor, a first probability map based on the current pose and the first laser key frame, wherein the first probability map is a probability map corresponding to the first lidar;
   collecting, by the second lidar, a current laser key frame to take as a second laser key frame;
   updating, by the processor, a second probability map based on the current pose and the second laser key frame, wherein the second probability map is a probability map corresponding to the second lidar;
   generating, by the processor, a first grid map corresponding to the updated first probability map;
   generating, by the processor, a second grid map corresponding to the updated second probability map; and
   obtaining, by the processor, a fused grid map based on the first grid map and the second grid map, and navigating the robot based on the fused grid map;
   wherein obtaining, by the processor, the fused grid map based on the first grid map and the second grid map comprises:
      aligning, by the processor, the first grid map and the second grid map according to a preset relative pose conversion relationship between the first lidar and the second lidar;
      determining a grid in the fused grid map as a black grid, in response to the grid meeting a first preset condition that the grid corresponds to a black grid in the first grid map;
      determining the grid in the fused grid map as a white grid, in response to the grid meeting a second preset condition that the grid corresponds to a grid that is not a black grid in the first grid map but corresponds to a white grid in the second grid map; and
      determining the grid in the fused grid map as a gray grid, in response to the grid neither meeting the first preset condition nor meeting the second preset condition.

2. The method of claim 1, wherein generating the first grid map corresponding to the updated first probability map comprises:
   determining an occupancy probability of a target grid in the updated first probability map, wherein the target grid is any grid in the first grid map; and
   determining a grid type of the target grid according to the occupancy probability.

3. The method of claim 2, wherein determining the grid type of the target grid according to the occupancy probability comprises:
   determining the target grid as a black grid, in response to the occupancy probability being larger than or equal to a preset probability threshold;
   determining the target grid as a white grid, in response to the occupancy probability being smaller than the preset probability threshold; and
   determining the target grid as a gray grid, in response to the occupancy probability being null.

4. The method of claim 1, wherein the relative pose conversion relationship is determined by:
   obtaining a first ranging result of the first lidar for a target object and a second ranging result of the second lidar for the target object, wherein the target object is placed vertically; and
   determining the relative pose conversion relationship based on the first ranging result and the second ranging result.

5. The method of claim 4, wherein a difference between the first ranging result and the second ranging result is calculated to obtain a horizontal distance between the first lidar and the second lidar, and the horizontal distance is taken as the relative pose conversion relationship.

6. The method of claim 1, wherein updating a first probability map according to the current pose and the first laser key frame comprises:
   updating a first count value and a second count value of each raytrace grid in the first probability map corresponding to the first laser key frame according to the current pose, wherein the raytrace grid is a grid of the first probability map where a ray from the first lidar to the obstacle passes, the first count value is an amount of times the grid being hit by the ray emitted from the first lidar, and the second count value is an amount of times the grid is the raytrace grid; and
   obtaining the updated first probability map by updating an occupancy probability of each link grid in the first probability map based on the updated first count value and the update second count value.

7. The method of claim 6, wherein the occupancy probability of each raytrace grid in the first probability map may be calculated using an equation of:

$$P(\text{hit1}) = n1/\text{visit1};$$

where, n1 denotes the first count value, visit1 denotes the second count value, and P(hit1) is the occupancy probability of the raytrace grid in the first probability map.

8. The method of claim 1, wherein calculating, by the processor, the current pose of the robot based on the first laser key frame comprises:
  performing, by the processor, iterative optimization by Gauss-Newton matching method so that laser contour points contained in the first laser key frame are aligned with contour points of the first probability map, and obtaining the aligned laser contour points; and
  back-calculating the current pose of the robot according to the aligned laser contour points.

9. The method of claim 8, wherein the first probability map is a probability map created according to each laser key frame collected by the first lidar; and
  wherein the first probability map is created when the first lidar captures the first laser key frame, and is updated whenever a laser key frame is collected by the first lidar.

10. A non-transitory computer-readable storage medium for storing one or more computer programs, wherein the one or more computer programs comprise:
  instructions for collecting, by a first lidar of a robot, a current laser key frame to take as a first laser key frame;
  instructions for calculating a current pose of the robot based on the first laser key frame;
  instructions for updating a first probability map based on the current pose and the first laser key frame, wherein the first probability map is a probability map corresponding to the first lidar;
  instructions for collecting, by a second lidar of the robot, a current laser key frame to take as a second laser key frame, wherein the first lidar is installed at a first position on the robot, the second lidar is installed at a second position on the robot, and the first position is higher than the second position, and wherein the first position prevents the first lidar from detecting a movable object in an external environment where the robot is located, and the second position enables the second lidar to detect the movable object;
  instructions for updating a second probability map based on the current pose and the second laser key frame, wherein the second probability map is a probability map corresponding to the second lidar;
  instructions for generating a first grid map corresponding to the updated first probability map;
  instructions for generating a second grid map corresponding to the updated second probability map; and
  instructions for obtaining a fused grid map based on the first grid map and the second grid map, and navigating the robot based on the fused grid map;
  wherein the instructions for obtaining the fused grid map based on the first grid map and the second grid map comprise:
    instructions for aligning the first grid map and the second grid map according to a preset relative pose conversion relationship between the first lidar and the second lidar;
    instructions for determining a grid in the fused grid map for navigating the robot as a black grid, in response to the grid meeting a first preset condition that the grid corresponds to a black grid in the first grid map;
    instructions for determining the grid in the fused grid map as a white grid, in response to the grid meeting a second preset condition that the grid corresponds to a grid that is not a black grid in the first grid map but corresponds to a white grid in the second grid map; and
    instructions for determining the grid in the fused grid map as a gray grid, in response to the grid neither meeting the first preset condition nor meeting the second preset condition.

11. The storage medium of claim 10, wherein instructions for the generating the first grid map corresponding to the updated first probability map comprise:
  instructions for determining an occupancy probability of a target grid in the updated first probability map, wherein the target grid is any grid in the first grid map; and
  instructions for determining a grid type of the target grid according to the occupancy probability.

12. The storage medium of claim 11, wherein the instructions for determining the grid type of the target grid according to the occupancy probability comprise:
  instructions for determining the target grid as a black grid, in response to the occupancy probability being larger than or equal to a preset probability threshold;
  instructions for determining the target grid as a white grid, in response to the occupancy probability being smaller than the preset probability threshold; and
  instructions for determining the target grid as a gray grid, in response to the occupancy probability being null.

13. The storage medium of claim 10, wherein the relative pose conversion relationship is determined by:
  obtaining a first ranging result of the first lidar for a target object and a second ranging result of the second lidar for the target object, wherein the target object is placed vertically; and
  determining the relative pose conversion relationship based on the first ranging result and the second ranging result.

14. The storage medium of claim 10, wherein the instructions for updating a first probability map according to the current pose and the first laser key frame comprise:
  instructions for updating a first count value and a second count value of each raytrace grid in the first probability map corresponding to the first laser key frame according to the current pose, wherein the raytrace grid is a grid of the first probability map where a ray from the first lidar to the obstacle passes, the first count value is an amount of times the raytrace grid being hit by the ray emitted from the first lidar, and the second count value is an amount of times the raytrace grid is the raytrace grid; and
  instructions for obtaining the updated first probability map by updating an occupancy probability of each link grid in the first probability map based on the updated first count value and the update second count value.

15. A robot, comprising:
  a first lidar;
  a second lidar, wherein the first lidar is installed at a first position on the robot, the second lidar is installed at a second position on the robot, and the first position is higher than the second position, and wherein the first position prevents the first lidar from detecting a movable object in an external environment where the robot is located, and the second position enables the second lidar to detect the movable object;
  a processor coupled to the first lidar and the second lidar;
  a memory coupled to the processor; and
  one or more computer programs stored in the memory and executable on the processor;
  wherein, the one or more computer programs comprise:
    instructions for collecting, by the first lidar, a current laser key frame to take as a first laser key frame;

instructions for calculating a current pose of the robot based on the first laser key frame;
instructions for updating a first probability map based on the current pose and the first laser key frame, wherein the first probability map is a probability map corresponding to the first lidar;
instructions for collecting, by the second lidar, a current laser key frame to take as a second laser key frame;
instructions for updating a second probability map based on the current pose and the second laser key frame, wherein the second probability map is a probability map corresponding to the second lidar;
instructions for generating a first grid map corresponding to the updated first probability map;
instructions for generating a second grid map corresponding to the updated second probability map; and
instructions for obtaining a fused grid map based on the first grid map and the second grid map, and navigating the robot based on the fused grid map;
wherein the obtaining the fused grid map based on the first grid map and the second grid map comprise:
instructions for aligning the first grid map and the second grid map according to a preset relative pose conversion relationship between the first lidar and the second lidar;
instructions for determining a grid in the fused grid map for navigating the robot as a black grid, in response to the grid meeting a first preset condition that the grid corresponds to a black grid in the first grid map;
instructions for determining the grid in the fused grid map as a white grid, in response to the grid meeting a second preset condition that the grid corresponds to a grid that is not a black grid in the first grid map but corresponds to a white grid in the second grid map; and
instructions for determining the grid in the fused grid map as a gray grid, in response to the grid neither meeting the first preset condition nor meeting the second preset condition.

16. The robot of claim 15, wherein instructions for the generating the first grid map corresponding to the updated first probability map comprise:
instructions for determining an occupancy probability of a target grid in the updated first probability map, wherein the target grid is any grid in the first grid map; and
instructions for determining a grid type of the target grid according to the occupancy probability.

17. The robot of claim 16, wherein the instructions for determining the grid type of the target grid according to the occupancy probability comprise:
instructions for determining the target grid as a black grid, in response to the occupancy probability being larger than or equal to a preset probability threshold;
instructions for determining the target grid as a white grid, in response to the occupancy probability being smaller than the preset probability threshold; and
instructions for determining the target grid as a gray grid, in response to the occupancy probability being null.

18. The robot of claim 15, wherein the relative pose conversion relationship is determined by:
obtaining a first ranging result of the first lidar for a target object and a second ranging result of the second lidar for the target object, wherein the target object is placed vertically; and
determining the relative pose conversion relationship based on the first ranging result and the second ranging result.

19. The robot of claim 15, wherein the instructions for updating a first probability map according to the current pose and the first laser key frame comprise:
instructions for updating a first count value and a second count value of each raytrace grid in the first probability map corresponding to the first laser key frame according to the current pose, wherein the raytrace grid is a grid of the first probability map where a ray from the first lidar to the obstacle passes, the first count value is an amount of times the raytrace grid being hit by the ray emitted from the first lidar, and the second count value is an amount of times the raytrace grid is the raytrace grid; and
instructions for obtaining the updated first probability map by updating an occupancy probability of each link grid in the first probability map based on the updated first count value and the update second count value.

20. The robot of claim 15, wherein the instructions for calculating the current pose of the robot based on the first laser key frame comprise:
instructions for performing iterative optimization by Gauss-Newton matching method so that laser contour points contained in the first laser key frame are aligned with contour points of the first probability map, and obtaining the aligned laser contour points; and
instructions for back-calculating the current pose of the robot according to the aligned laser contour points.

* * * * *